Dec. 11, 1934.  H. H. COLE  1,983,898
IDENTIFICATION CAMERA
Filed June 20, 1932   3 Sheets-Sheet 1

Inventor
Harry H. Cole
By Ronald M. Adams
His Attorney

Dec. 11, 1934.   H. H. COLE   1,983,898
IDENTIFICATION CAMERA
Filed June 20, 1932   3 Sheets-Sheet 2

Inventor
Harry H. Cole
By Ronald M. Adams
His Attorney

Dec. 11, 1934.  H. H. COLE  1,983,898
IDENTIFICATION CAMERA
Filed June 20, 1932    3 Sheets-Sheet 3
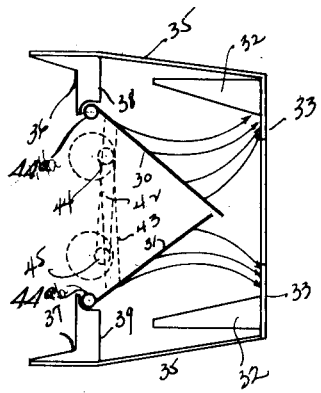
Fig 5
Fig 6
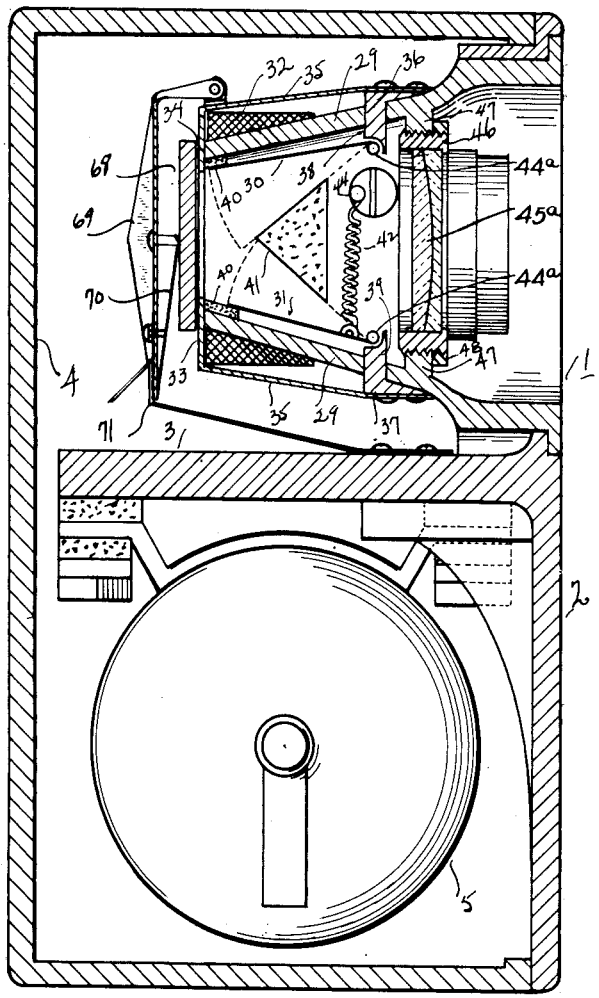
Fig 4
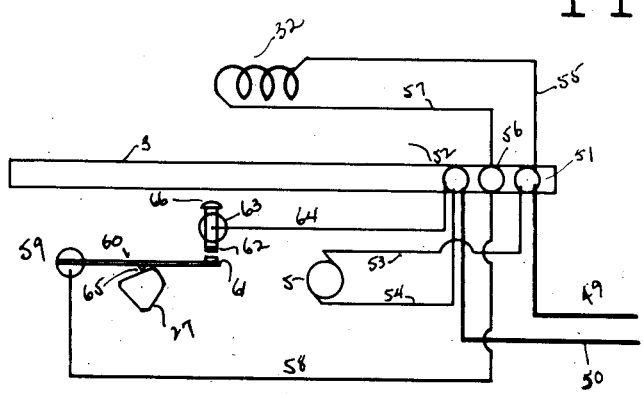
Inventor
Harry H. Cole
By Ranaea M. Adams
His Attorney Patented Dec. 11, 1934

1,983,898

UNITED STATES PATENT OFFICE 1,983,898

IDENTIFICATION CAMERA

Harry H. Cole, Eagle River, Wis., assignor of three-fourths to August H. Meyer, Oshkosh, Wis.

Application June 20, 1932, Serial No. 618,216

8 Claims. (Cl. 88—19.3)

The present invention relates to an identification camera and more particularly to a motor driven camera for taking a series of photographs in predetermined time-sequence at progressively varying exposures.

The camera embodying the present invention is designed to make a photographic record of a series of events for purposes of identification. Particular application of the device is that of photographing bank holdups for identifying the participants.

The applicant refers to co-pending cases, serial numbers 515,016 and 535,687 relating to automatic cameras for similar uses.

An object of the invention is to provide for a motor-driven camera having a simple, magnetically-operated shutter.

Another object of the invention is to provide for an automatic intermittent film feed synchronized with a multi-speed shutter.

Another object of the invention is to provide for a shutter wherein the opening and closing operations are accomplished in a minimum of time without regard for the time the shutter remains open during the exposure.

Another object of the invention is to provide for a shutter in which the shutter blades themselves are directly actuated by magnetism.

Another object of the invention is to provide for a shutter having a plurality of independently variable speeds.

Another object of the invention is to provide for mounting the mechanism of the camera on a frame comprising the front cover to facilitate loading and adjustment while the camera case is permanently installed in a wall.

Various other objects will be apparent from the following description and claims when read in connection with the accompanying drawings, in which Fig. 1 is a view in rear elevation of a camera made in accordance with the present invention, parts being broken away to show details of construction.

Fig. 4 is a view taken on the line 4—4 of Fig. 1.

Fig. 5 is a diagrammatic view of the shutter.

Fig. 6 is a diagrammatic view of the wiring system of the camera.

Figure 1:
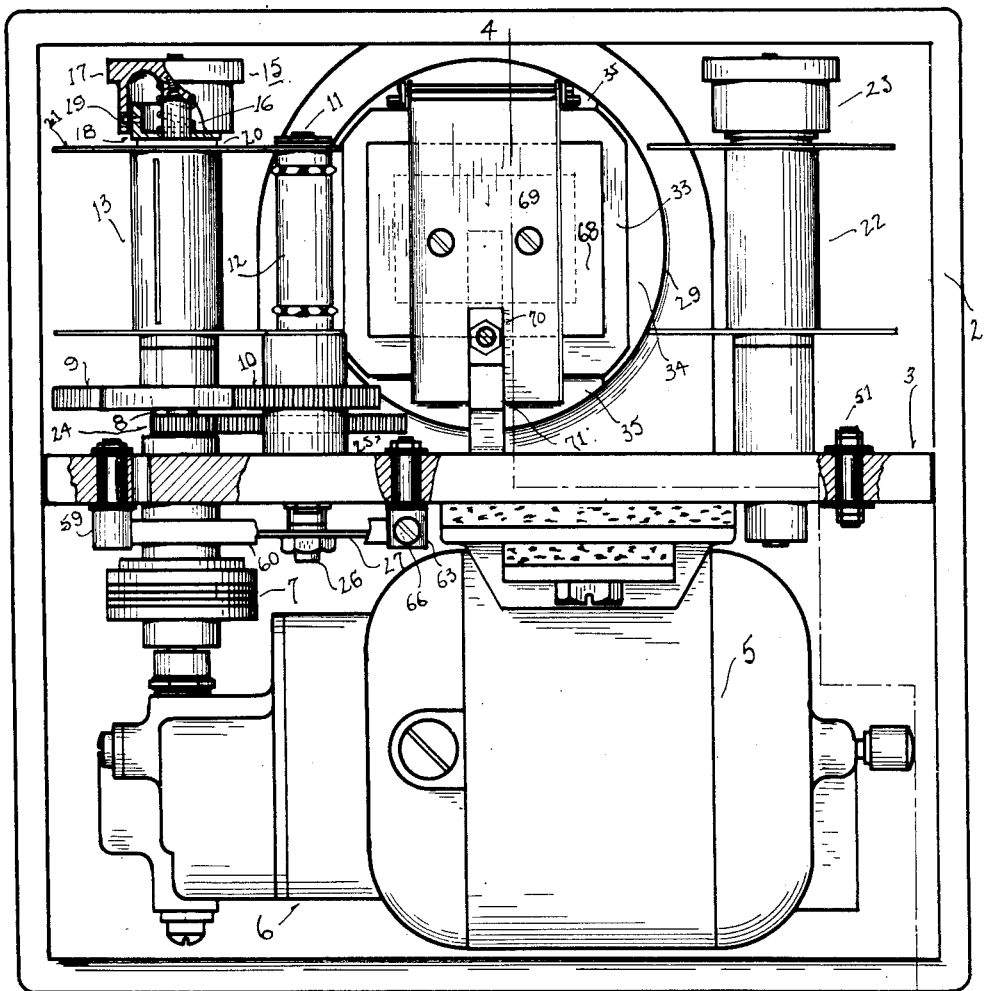

Referring now to the drawings, the camera has a frame 1 of T-shape, the vertical web 2 thereof forming the front face of the camera case. The frame 1 and case are preferably of light metal such as cast aluminum which is sufficiently strong for the purpose and which is proof against objectionable corrosion.

The horizontal web 3 of the frame 1 serves the dual purpose of a support for the feeding mechanism of the camera and that of a light-tight baffle to more fully protect the sensitized film from accidental exposure due to sparks from the motor and electrical contacts.

The frame 1 cooperates with a rear casing element 4 to enclose the camera mechanism in a dust- and light-proof box. The casing 4 is designed to be permanently installed in a wall or other desirable place, and re-loading and inspection of the camera is accomplished by removal of the frame 1 from the casing, since all mechanical parts are attached to the frame. This construction makes it possible to set the casing 4 permanently in the wall so that the camera will cover a prescribed field, and thereafter all adjustments may be made without disturbing focus or alignment.

The mechanism of the camera is driven by a constant speed motor 5 slung from the web 3 of the frame 1. The motor 5 is geared down by a conventional speed reducer 6, and power is transmitted therefrom through a coupling 7 and shaft 8 to an intermittent drive gear 9. The drive gear 9 drives an intermittent sprocket gear 10, sprocket shaft, 11, and film sprocket 12.

The shaft 8 extends upwardly to receive and drive the film take-up spool 13, which draws the sensitized film 14 across the focal plane as will be hereinafter described.

The take-up spool 13 is driven through a self-contained clutch 15, which screws onto the upper end of the shaft 8 like an ordinary nut. The clutch 15 comprises a retainer for the spring 16 having upper and lower cups 17 and 18 respectively, which telescope and are held in place by screws 19. The under face of the lower cup 18 is provided with a leather disc 20, disposed to contact with the face 21 of the takeup spool 13.

The loading spool 22, which holds a supply of raw film stock, is not driven, but is provided with a clutch 23, in all respects similar to the clutch 15, its purpose being to maintain proper tension on the film 14 as it is drawn across the focal plane.

The shaft 8 is also fitted with a drive gear 24 for timing the shutter synchronously with the feed of the film 14. The drive gear 24 operates the cam gear 25 which rotates the shaft 26. The shaft 26 passes through the web 3 of the frame 1 to the motor compartment beneath the web, and drives the triangular shaped cam 27.

The cam 27 is of insulating material such as fibre, and the apices 28 of the triangle are shaped to give the various shutter speeds, as will be set forth hereinafter.

The shutter mechanism is mounted in a tapered barrel 29 which is secured to the front face 2 of the camera case. The barrel is of non-magnetic material such as brass or aluminum. Shutter blades 30 and 31 are hinged to swing in the manner of a gate to control the passage of light through the barrel 29 to the sensitized film 14 at the focal plane.

In order to open the blades 30 and 31 rapidly, and accurately with respect to the stoppage of the feed of the film 14, the blades are disposed within the field of a helix 32 in the path of the magnetic fluxes which are generated when the helix is energized by the flow of current. A plate 33 which acts as a film guide is disposed across the end 34 of the barrel 29 and defines the focal plane. The plate 33 is preferably soft iron or steel to serve as a good conductor for magnetic fluxes.

The ends 35 of the plate 33 are bent forwardly under and over the helix 32 to serve as conductors for the flux as described above. The bases 36 and 37 to which the ends 35 are connected are provided with angular extensions 38 and 39 which project into the lens barrel 29 and conduct the fluxes around the forward end of the barrel. The ends of the extensions are shaped to receive the hinged ends of the shutter blades without interfering with the free movement of said blades about their respective pivots.

The shutter blades 30 and 31 are likewise of good flux-conducting material.

In order to restrict the movement of the blades 30 and 31, bumpers of cork 40 or other suitable material are placed in a position to engage the ends of the blades in open position, and triangular pieces 41 of similar material are secured to the sides of the barrel 29 to engage the side edges of the blades when in closed position.

It is to be noted particularly that while the blades 30 and 31 overlap to restrict the passage of light when in closed position, nevertheless they do not actually come into contact with one another. The purpose of this separation is to prevent the change of polarity which would occur if they did contact, and the resultant impairment of the efficiency of the shutter. The bumpers 40 which serve to stop the blades in open position serve a somewhat different purpose: they prevent sticking of the blades to the plate 33, due to residual magnetism when the current in the helix 32 is shut off.

The blades 30 and 31 are independently biased in a closed position by suitable tension springs 42 and 43 which are hooked to the blades 30 and 31 respectively and to eccentric pins 44 and 45, by means of which the tension of the springs can be adjusted.

It will be seen that when the helix 32 is energized the fluxes will flow through the plate 33, the bases 36 and 37, the extensions 38 and 39, across the points of the angular extensions, through the blades 30 and 31, and back to the plate 33. This constitutes a complete magnetic circuit when the blades are in open position. When the blades are closed, they are out of equilibrium, and as the current is turned on, the blades open rapidly to the position against the bumpers as described above. This operation is facilitated by the fact that the blades are of magnetizable material and that they are disposed in the line of maximum flux. The pull on the blades is greatest when they are farthest out of equilibrium with respect to the flux flow, and hence the opening movement is most rapid at first, and possessing a tendency to diminish as the blades reach their extreme position.

The rapid opening of the shutter blades is a highly desirable feature in a camera using high speed film since it gives a more uniform exposure to the whole image.

In order to maintain the shutter blades 30 and 31 in the open position as long as the helix 32 is energized, the pivots 44a of the blades are so arranged that the blades do not reach a parallel position with respect to the flux, and hence so long as the helix is energized, the blades will be drawn outwardly against the bumpers 40 and sustained in open position. If allowed to swing to a parallel position, or one of equilibrium, there will be a tendency toward oscillation since the forces of magnetism would not be effective.

To prevent excessive wear and scratching of the soft iron plate 33 by the film, the plate may be plated with chromium without impairing its magnetic characteristics.

The lens 45a is secured in a threaded lens mount 46 which engages corresponding threads of an annular flange 47 disposed within the barrel 29 ahead of the shutter. The lens mount 46 is preferably short enough not to project beyond the surface of the case 2 so that the camera may be shipped and handled without injury to the lens, and to facilitate concealment.

The lens 45 is focussed by rotating the mount in the threaded flange 47, where it is secured in desired focus by a lock ring 48.

Current for operation of the camera is supplied by the leads 49 and 50 which connect with the terminals 51 and 52, mounted on the web 3 of the frame. The motor 5 is operated by current supplied through the following circuit: from the terminal 51 through the lead 53 in the motor compartment of the camera, through the motor 5 and back to the terminal 52 through the lead 54.

The shutter circuit is as follows: from the terminal 51 through the lead 55 above the web 3 to the shutter helix 32, and thence back to the terminal 56 through the lead 57, through the terminal 56 to the lead 58 beneath the web 3, to the contactor terminal 59, through the contactor spring 60, contactor points 61 and 62, terminal 63, and lead 64 to the terminal 52.

The circuit of the shutter helix 32 is controlled by the contactor spring 60 and associated parts. The spring 60 tends to keep the points 61 and 62 separated, but the rotation of the cam 27 as described hereinafter, causes the apeces 28 thereof to strike the projection 65 on the spring and to close the shutter circuit.

The cam 27 is so shaped that successive closing operations of the contactor will be of different duration. If the points are kept closed during 30 degrees of rotation of the cam, the exposure of the film 14 will be of a duration proportionate to the rotating speed of the cam. Thus, for example, three different shutter speeds may be obtained by using a cam having apeces 28 of 30, 6, and 1 degrees.

Where it is desirable to change the high speed of the shutter to accommodate some condition of light in a camera installation, this may be accomplished by turning the adjusting screw 66 to move the contact point 62 toward or away from the contactor point 61. Because of the relatively short approach and decline of the 1-degree cam, a slight adjustment of the distance between the contact points has a marked effect, while on the longer shutter speeds, such adjustment is hardly noticeable. The camera can thus be adapted to a large scale of operation by a simple adjustment.

Figure 2:
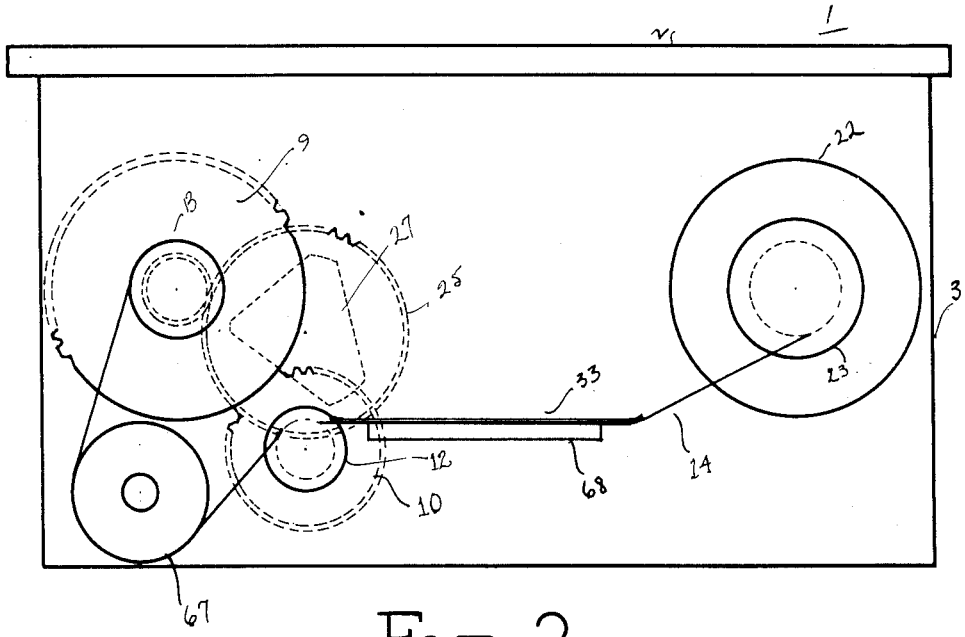
Fig. 2 is a top plan view of the sprocket, spools, and driving mechanism showing the film in operative position.
Figure 3:
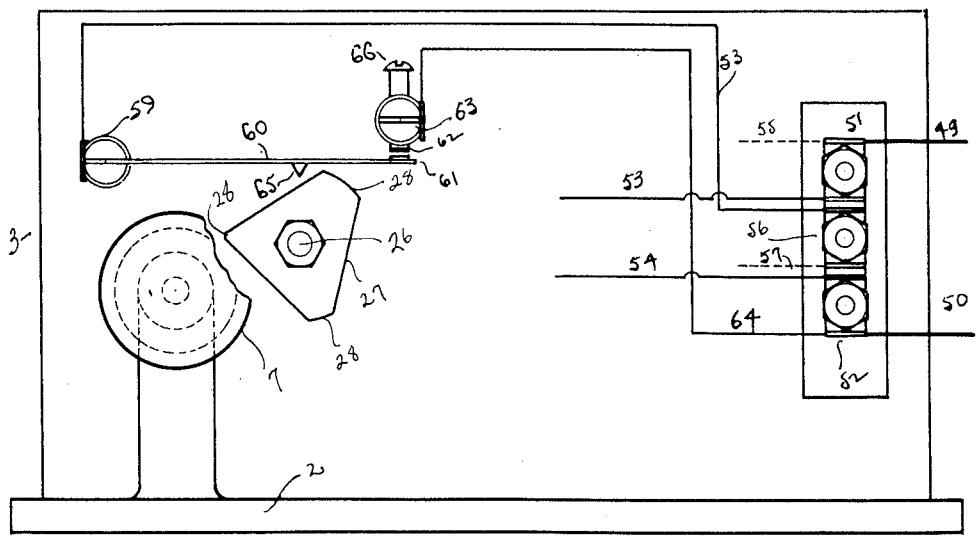
Fig. 3 is a bottom view of the camera with motor removed to reveal details of the electrical system.

The film 14, as mentioned above, is supplied to the camera in a loading spool 22, is threaded thence across the focal plane plate 33 and to the flanged sprocket 12, the teeth of which engage the perforated edges of the film. See Fig. 2. The film is then threaded around an idler pulley 67 and thence to the take-up spool 13.

During the operation of the camera, the film 14 is held in close contact with the plate 33 to insure correct focus, by means of a pressure plate 68 which is loosely though securely mounted on a hinged member 69. Pressure is secured by means of a spring 70 which bears against the plate 68. A spring catch 71 locks the hinged member 69 when in closed position.

The operation of the camera is as follows: When the film is threaded through the sprocket and spools as described above, and the lens is focussed, the camera is ready for use. The circuit controlling the camera through leads 49 and 50 may be closed by means of floor-treads, push-buttons, or other devices conveniently located throughout the bank.

When the circuit is closed, the motor 5 drives the intermittent gears 9 and 10 through the shaft 8. The film sprocket 12, being driven by the gear 10, operates intermittently regulating the traveling and stopping of the film across the focal plane.

During the interval when the film is at rest, the tension of the film between the sprocket 12 and the takeup spool 13 overcomes the friction of the clutch 15, stopping rotation of the take-up spool 13. When the intermittent gears start to rotate the sprocket, the reverse condition prevails and the take-up spool 13 revolves under friction of the clutch and winds up the exposed film.

In the interval when the film 14 is at rest, the cam 27 lies in such a position that one of the apeces 28 thereof engages the projection 65 on the contactor spring and closes the shutter circuit to expose the film, thus avoiding a blurred and indistinct image.

It will be seen that the sprocket 12 does not operate in the same manner at all times. When the take-up spool has relatively little film on it, the leverage exceeds that of the loading spool. Hence, the sprocket merely serves to stop the film intermittently. However, when the take-up spool is filled to a greater extent than the loading spool, the leverage of the latter is greater, and the drive of the film across the focal plane is accomplished by the power exerted by the sprocket 12 in addition to that of the takeup spool. Thus the sprocket 12, being positively driven, serves to regulate the length of travel of the film for each exposure, regardless of varying diameter of the take-up spool.

As explained above, the shutter blades 30 and 31 swing open when the shutter circuit is closed, and stay open until the circuit is broken. The cam 27, having three projections of different size, produces exposures of successively varying lengths.

Of these exposures, the longest gives the maximum negative density and provides the best negatives made when the light is poor. The fastest speed stops motion of the person being photographed and prevents blurred images and produces negatives of good density in good light. The exposure of medium length tends toward compromise, stopping not-too-rapid motion and producing negatives of good density under average lighting conditions.

The shutter speeds are such that the full scale of the film's latitude is employed. Where the latitude is 1 to 20, for example, the long exposure may be ½ second, the medium 1/10, and the shortest 1/40 of a second.

Thus during a holdup, photographs are taken at intervals of approximately two seconds at three different shutter speeds. Regardless of conditions, one of the three exposures is normally good, while usually all three of the negatives are usable and will produce printing images.

It will be seen that the above description is illustrative only and that various modifications may be employed within the scope of the appended claims.

I claim:

1. In an automatic camera, in combination, a shutter, comprising hinged shutter blades, a magnetic yoke disposed about said blades, a helix within the yoke for setting up a magnetic field about said yoke, the yoke and shutter blades forming a substantially closed magnetic circuit when the shutter blades are in open position, a circuit in said camera controlling the energization of the helix, and automatically operated means disposed within the circuit to alternately open and close the same to produce a succession of photographic exposures.

2. In an automatic camera, in combination, a shutter, comprising a plurality of magnetizable shutter blades, a helix disposed to actuate said blades by magnetism, a magnetic yoke disposed about the helix and shutter blades to conduct magnetic fluxes through said blades to cause them to swing outwardly when the helix is energized to admit light for photographic exposures, a circuit controlling the energization of the helix, and cam means disposed to make and break the helix circuit to produce a series of progressively varying exposures.

3. In an automatic camera, in combination, a shutter for controlling the passage of light to a sensitized film within the camera, comprising a pair of blades of magnetic material hinged at one end and disposed within a light-tight tube of non-magnetic material, a helix surrounding said tube disposed in a position to actuate said blades by magnetism when energized to cause them to swing to a position permitting light to pass through the tube, a magnetic yoke disposed to conduct magnetic fluxes from the helix through the shutter blades, said yoke and blades forming a substantially closed magnetic circuit when said blades are open, means disposed in the helix circuit to alternately make and break said circuit to produce a series of photographic exposures.

4. In a motor-driven camera, a pair of intermittent gears, a film sprocket disposed to engage the perforated edges of a sensitized film and to regulate the feed of the film across the focal plane, said sprocket being driven intermittently by said gears, a magnetically operated shutter for exposing said film, electrical contacts for controlling the shutter, a cam driven in synchronism with the feed of the film disposed to close the contacts each time the film is at rest.

5. In a motor-driven camera, a magnetically operated shutter, a cam disposed to operate the contacts controlling the operation of the shutter, said cam having operating surfaces of successively varying dimensions to give shutter speeds of proportionate duration in succession.

6. In a motor driven camera, in combination, a shutter comprising a helix, a pair of magnetizable shutter blades disposed within the helix to be actuated by the fluxes generated by the helix, said blades also being disposed at an angle to the fluxes, pivoted at one end, and being restricted in movement to always maintain said blades at an angle so that the forces of magnetism generated by the helix will at all time be effective to actuate the blades, a circuit controlling the energization of the helix, cam means disposed to make and break the circuit at predetermined, spaced time intervals, to produce a corresponding series of photographic exposures.

7. In a motor driven camera, in combination, a shutter comprising a helix, a pair of shutter blades disposed within the helix, means for biasing the blades in a closed position, a magnetic yoke disposed about the helix in a manner to conduct the magnetic fluxes generated by the helix to the shutter blades, the blades being pivoted at one end, and said pivot being disposed to maintain the blades at an angle to the magnetic fluxes so that the magnetic forces will at all times be effective to actuate the blades, a circuit controlling the energization of the helix, a cam having a series of apices of varying size, electrical contacts disposed to be closed by contact with said apices, and means for rotating said cam to close the contacts for a series of varying intervals, to produce a succession of varying photographic exposures.

8. In a motor driven camera, in combination, a shutter comprising a helix, a plurality of hinged shutter blades disposed within the helix, means for biasing the blades in a closed position, means for restricting the movement of the blades outwardly away from one another to keep said blades at angle to the magnetic fluxes at all times, a circuit controlling the helix, and means for making and breaking the helix circuit at predetermined spaced time-intervals to produce a succession of corresponding photographic exposures.

HARRY H. COLE.